(12) United States Patent
Abhinav et al.

(10) Patent No.: US 12,112,145 B2
(45) Date of Patent: Oct. 8, 2024

(54) ARTIFICIAL INTELLIGENCE-BASED INTELLIGENT PROGRAMMING ASSISTANCE

(71) Applicant: ACCENTURE GLOBAL SOLUTIONS LIMITED, Dublin (IE)

(72) Inventors: Kumar Abhinav, Hazaribag (IN); Alpana Dubey, Bangalore (IN); Hindnavis Vijaya Shravani, Hyderabad (IN); Meenakshi D'Souza, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 319 days.

(21) Appl. No.: 17/370,670

(22) Filed: Jul. 8, 2021

(65) Prior Publication Data
US 2022/0012021 A1 Jan. 13, 2022

(30) Foreign Application Priority Data

Jul. 9, 2020 (IN) .............................. 202011029184

(51) Int. Cl.
G06F 8/33 (2018.01)
G06N 3/044 (2023.01)
G06N 3/045 (2023.01)

(52) U.S. Cl.
CPC .............. G06F 8/33 (2013.01); G06N 3/044 (2023.01); G06N 3/045 (2023.01)

(58) Field of Classification Search
CPC ........... G06F 8/33; G06N 3/045; G06N 3/044
(Continued)

(56) References Cited

U.S. PATENT DOCUMENTS

2013/0031094 A1* 1/2013 Kozak .................. G06F 16/951
707/E17.089
2013/0290342 A1* 10/2013 Cooper .................. G06F 40/30
707/740
(Continued)

OTHER PUBLICATIONS

Sahil Bhatia et al., "Neuro-Symbolic Program Corrector for Introductory Programming Assignments", 2018 ACM/IEEE 40th International Conference on Software Engineering, May 27-Jun. 3, 2018, pp. 60-70.

(Continued)

*Primary Examiner* — Bradford F Wheaton
(74) *Attorney, Agent, or Firm* — Mannava & Kang, P.C.

(57) ABSTRACT

In some examples, artificial intelligence-based intelligent programming assistance may include ascertaining, for a software program that is to be completed, code for the program, and identifying, based on an analysis of error message-based contextual information associated with the ascertained code, an error in the ascertained code. A resolution to the identified error may be generated, and the code may be modified to resolve the identified error, Based on an analysis of problem description-based contextual information associated with the ascertained code, a next token associated with the ascertained code may be generated, and used to generate further code for the program. A performance of a user may be analyzed with respect to generation of the code for the program to generate feedback for the user. A query associated with the program may be ascertained from the user, and classified by utilizing an ontology to generate a response to the query.

20 Claims, 18 Drawing Sheets

(58) Field of Classification Search
USPC .......................................................... 717/106
See application file for complete search history.

(56) References Cited

U.S. PATENT DOCUMENTS

| | | | | |
|---|---|---|---|---|
| 2016/0147637 | A1* | 5/2016 | Bhagavan | G06F 16/245 717/127 |
| 2019/0129701 | A1* | 5/2019 | Hawrylo | G06F 8/60 |
| 2019/0163609 | A1* | 5/2019 | Rabasco | G06N 20/00 |
| 2020/0097389 | A1* | 3/2020 | Smith | G06F 11/0793 |
| 2021/0011714 | A1* | 1/2021 | Goodsitt | G06N 3/044 |
| 2021/0034335 | A1* | 2/2021 | Svyatkovskiy | G06N 3/088 |

OTHER PUBLICATIONS

Rahul Gupta et al., "DeepFix: Fixing Common C Language Errors by Deep Learning", Proceedings of the Thirty-First AAAI Conference on Artificial Intelligence (AAAI-17), 2017, pp. 1345-1351.

Jiwei Li et al., "A Persona-Based Neural Conversation Model", Jun. 8, 2016, 10 pages.

Claire Le Goues et al., "Automated Program Repair", Communications of the ACM, Dec. 2019, vol. 62 No. 12, pp. 56-65.

Kui Liu et al., "TBar: Revisiting Template-Based Automated Program Repair", Jun. 6, 2019, 12 pages.

Zimin Chen et al., "SequenceR: Sequence-to-Sequence Learning for End-to-End Program Repair", IEEE Transactions on Software Engineering, Sep. 9, 2019, 17 pages.

Marko Vasic et al., "Neural Program Repair by Jointly Learning to Localize and Repair", Apr. 3, 2019, 12 pages.

Geunseok Yang et al., "Applying deep learning algorithm to automatic bug localization and repair", SAC '20: Proceedings of the 35th Annual ACM Symposium on Applied ComputingMar. 2020 pp. 1634-1641.

Darshak Chhatbar et al., "MACER: A Modular Framework for Accelerated Compilation Error Repair", International Conference on Artificial Intelligence in Education AIED 2020: Artificial Intelligence in Education pp. 106-117. Downloaded online on Aug. 9, 2021. <https://link.springer.com/chapter/10.1007/978-3-030-52237-7_9>.

Ali Mesbah et al., "DeepDelta: Learning to Repair Compilation Errors", ESEC/FSE '19, Aug. 26-30, 2019, Tallinn, Estonia, pp. 925-936.

Anil Koyuncu et al., "iFixR: Bug Report driven Program Repair", Jul. 12, 2019, 12 pages.

Daniel Tarlow et al., "Learning to Fix Build Errors with Graph2Diff Neural Networks", 2020 IEEE/ACM 42nd ICSEW, May 20-23, 2020 Seoul, Korea, pp. 19-20.

Gupta et al. "Deep Reinforcement Learning for Syntactic Error Repair in Student Programs", Association for the Advancement of Artificial Intelligence, 2019, pp. 930-937.

Hossein Hajipour et al., "SampleFix: Learning to Correct Programs by Sampling Diverse Fixes", Sep. 9, 2019, 10 pages.

Rahul Gupta et al., "Deep Learning for Bug-Localization in Student Programs", May 28, 2019, 17 pages.

Madeline Endres et al., "InFix: Automatically Repairing Novice Program Inputs", Nov. 1, 2019, 2019 34th IEEE/ACM International Conference on Automated Software Engineering (ASE), 12 pages.

Umair Z. Ahmed et al., "Compilation Error Repair: For the Student Programs, From the Student Programs", ICSE-SEET'18, May 27-Jun. 3, 2018, Gothenburg, Sweden, 10 pages.

Junho Lee et al., "Automatic Diagnosis and Correction of Logical Errors for Functional Programming Assignments", Proc. ACM Program. Lang. 2, OOPSLA, Article 158 (Nov. 2018), 30 pages. https://doi.org/10.1145/3276528.

Rajdeep Das et al., "Prutor: A System for Tutoring CS1 and Collecting Student Programs for Analysis", Aug. 15, 2016, 46 pages.

Johannes Bader et al., "Getafix: Learning to Fix Bugs Automatically", Proc. ACM Program. Lang. 3, OOPSLA, Article 159 (Oct. 2019), 27 pages. https://doi.org/10.1145/3360585.

Yewen Pu et al., "sk_p: a neural program corrector for MOOCs", Jul. 11, 2016, 12 pages.

Renee Mccauley et al., "Debugging: a review of the literature from an educational perspective", Computer Science Education, vol. 18, No. 2, Jun. 2008, pp. 67-92.

Hyunmin Seo et al., "Programmers' Build Errors: A Case Study (at Google)", ICSE '14, May 31-Jun. 7, 2014, Hyderabad, India, pp. 724-734.

Martin Monperrus, "Automatic Software Repair: a Bibliography", ACM Computing Surveys, vol. online, No. , Article , Publication date: Jun. 2017, 26 pages.

Mike Schuster et al., "Bidirectional Recurrent Neural Networks", IEEE Transactions on Signal Processing, vol. 45, No. 11, Nov. 1997, pp. 2673-2681.

Alex Graves et al., "Hybrid Speech Recognition With Deep Bidirectional LSTM", 2013 IEEE Workshop on Automatic Speech Recognition and Understanding, 2013, pp. 273-278, doi: 10.1109/ASRU.2013.6707742.

Martin Sundermeyer et al., "Translation Modeling with Bidirectional Recurrent Neural Networks", Proceedings of the 2014 Conference on Empirical Methods in Natural Language Processing (EMNLP), pp. 14-25, Oct. 25-29, 2014, Doha, Qatar.

Dzmitry Bahdanau et al., "Neural Machine Translation by Jointly Learning to Align and Translate", May 19, 2016, 15 pages.

Kyunghyun Cho et al., "Learning Phrase Representations using RNN Encoder-Decoder for Statistical Machine Translation", Sep. 3, 2014, 15 pages.

Ilya Sutskever et al., "Sequence to Sequence Learning with Neural Networks", NIPS'14: Proceedings of the 27th International Conference on Neural Information Processing Systems—vol. 2Dec. 2014 pp. 3104-3112.

Oriol Vinyals et al., "Grammar as a Foreign Language", Advances in Neural Information Processing Systems 28 (NIPS 2015), 9 pages>.

Nitish Srivastava et al., "Dropout: A Simple Way to Prevent Neural Networks from Overfitting", Journal of Machine Learning Research 15 (2014) 1929-1958.

Diederik P. Kingma et al., "ADAM: A Method for Stochastic Optimization", Published as a conference paper at ICLR 2015, 15 pages.

Paul Denny et al., "All Syntax Errors Are Not Equal", ITiCSE'12, Jul. 3-5, 2012, Haifa, Israel, pp. 75-80.

Anthony Robins, "Novice programmers and introductory programming", In S. A. Fincher & A. V. Robins (Eds.) The Cambridge Handbook of Computing Education Research. Cambridge, UK: Cambridge University Press, 2019, pp. 327-376.

Stig Ottosson et al., "Visualize what to be coded before programming!", Mar. 15, 2020, 6 pages.

Divya Gopinath et al., "Specification-Based Program Repair Using SAT", TACAS 2011, LNCS 6605, pp. 173-188, 2011.

CLaire Le Goues et al., "GenProg: A generic method for automatic software repair", Mar. 2012IEEE Transactions on Software Engineering 38(1):54-72.

* cited by examiner

Prob: 100
In function 'main':
8:10: error: 'i' undeclared (first use in this function)
for (i=0;i<n;i++)
        ^
8:10: note: each undeclared identifier is reported only once for each function it appears in
11:18: error: 'j' undeclared (first use in this function)
for (j=1;j<n;j++)
        ^

Prob: 156
In function 'main':
50:17: error: 'sumstat' undeclared (first use in this function)
printf("%d", sumstat);
              ^
50:17: note: each undeclared identifier is reported only once for each function it appears in

Prob: 274
In function 'main':
13:13: error: 'c' undeclared (first use in this function)
c++;
^
13:13: note: each undeclared identifier is reported only once for each function it appears in

Prob: 346
In function 'main':
18:17: error: 'i' undeclared (first use in this function)
for (i=0;i<count[k];i++)
        ^
18:17: note: each undeclared identifier is reported only once for each function it appears in

Prob: 167
In function 'cumulative_sum':
6:36: error: 'n' undeclared (first use in this function)
s = a[start]+cumulative_sum(a,1,n-1);
                                ^
6:36: note: each undeclared identifier is reported only once for each function it appears in

Prob: 222
In function 'main':
14:18: error: expected expression before '<' token
if ((b-a)*(c-a)<0) printf("Median weighted score=%4.2f", a);
                ^
15:23: error: expected expression before '<' token
else if ((a-b)*(c-b)<0) printf("Median weighted score=%4.2f", b);
                    ^

*FIG. 6*

| Question | Answer |
|---|---|
| Performance of the code<br>What is the allowed maximum running time for the Fibonacci code? | The tight upper bound on Fibonacci code is O(1.6180)" |
| SQL<br>What is SQL JOIN and what are the different types? | SQL JOIN is a method to retrieve data from two or more database tables.<br>There are a total of five JOINs. They are : Inner join, Outer join, Left join, Right join, Full join, Natural join, Cross join, Self join |
| File not found exception<br>java new File() says FileNotFoundException but file exists | There are three cases where a FileNotFoundException may be thrown.<br>1. The named file does not exist.<br>2. The named file is actually a directory.<br>3. The named file cannot be opened for reading for some reason. |

*FIG. 7*

| Error Code | Error Messages | Error Count | Repair Accuracy |
|---|---|---|---|
| E1 | Expected _ after expression | 4099 | 73.2% |
| E2 | Use of undeclared identifier _ | 4709 | 82.4% |
| E3 | Expected expression _ | 3818 | 51.2% |
| E4 | Expected _ in _ statement specifier | 720 | 57.6% |
| E5 | Expression is not assignable | 538 | 29.4% |

```
┌─────────────────────────────────────────────────────────────┐
│ ASCERTAIN, FOR A SOFTWARE PROGRAM THAT IS TO BE COMPLETED,  │
│                  CODE FOR THE PROGRAM                       │
│                          1302                               │
└─────────────────────────────────────────────────────────────┘
                              ▼
┌─────────────────────────────────────────────────────────────┐
│  IDENTIFY, BASED ON AN ANALYSIS OF THE ASCERTAINED CODE AND │
│  ERROR MESSAGE-BASED CONTEXTUAL INFORMATION ASSOCIATED      │
│   WITH THE ASCERTAINED CODE, AN ERROR IN THE ASCERTAINED    │
│                           CODE                              │
│                           1304                              │
└─────────────────────────────────────────────────────────────┘
                              ▼
┌─────────────────────────────────────────────────────────────┐
│   GENERATE, BASED ON THE IDENTIFIED ERROR, A RESOLUTION TO  │
│                  THE IDENTIFIED ERROR                       │
│                          1306                               │
└─────────────────────────────────────────────────────────────┘
                              ▼
┌─────────────────────────────────────────────────────────────┐
│  MODIFY, BASED ON THE GENERATED RESOLUTION TO THE IDENTIFIED│
│   ERROR, THE CODE FOR THE PROGRAM TO RESOLVE THE IDENTIFIED │
│                           ERROR                             │
│                           1308                              │
└─────────────────────────────────────────────────────────────┘
                              ▼
┌─────────────────────────────────────────────────────────────┐
│ GENERATE, BASED ON AN ANALYSIS OF THE ASCERTAINED CODE AND  │
│ PROBLEM DESCRIPTION-BASED CONTEXTUAL INFORMATION            │
│ ASSOCIATED WITH THE ASCERTAINED CODE, A NEXT TOKEN          │
│          ASSOCIATED WITH THE ASCERTAINED CODE               │
│                          1310                               │
└─────────────────────────────────────────────────────────────┘
                              ▼
┌─────────────────────────────────────────────────────────────┐
│   GENERATE, BASED ON THE NEXT TOKEN ASSOCIATED WITH THE     │
│    ASCERTAINED CODE, FURTHER CODE FOR THE PROGRAM           │
│                          1312                               │
└─────────────────────────────────────────────────────────────┘
                              ▼
┌─────────────────────────────────────────────────────────────┐
│    ADD THE FURTHER GENERATED CODE TO THE CODE FOR THE       │
│                       PROGRAM                               │
│                        1314                                 │
└─────────────────────────────────────────────────────────────┘
```

ASCERTAIN, FOR THE PROGRAM, A PERFORMANCE OF A USER WITH RESPECT TO GENERATION OF THE CODE FOR THE PROGRAM
1316

GENERATE, BASED ON THE ANALYZED PERFORMANCE OF THE USER, FEEDBACK FOR THE USER
1318

ASCERTAIN, FROM THE USER, A QUERY ASSOCIATED WITH THE PROGRAM
1320

CLASSIFY, BY UTILIZING AN ONTOLOGY, THE QUERY INTO A SPECIFIED CONCEPT OF A PLURALITY OF CONCEPTS
1322

GENERATE, BASED ON AN ANALYSIS OF THE CLASSIFIED QUERY, A RESPONSE TO THE QUERY
1324

*FIG. 13 (CONT.)*

ARTIFICIAL INTELLIGENCE-BASED INTELLIGENT PROGRAMMING ASSISTANCE

CROSS-REFERENCE TO RELATED APPLICATION(S)

This application claims priority to Indian Provisional Patent Application Serial Number 202011029184, filed Jul. 9, 2020, titled "ARTIFICIAL INTELLIGENCE-BASED INTELLIGENT PROGRAMMING ASSISTANCE", which is incorporated by reference in its entirety.

BACKGROUND

A user, such as a student, or another such individual, may develop a program, such as a software program. In this regard, the user may obtain the assistance of a tutor, or another such individual. The tutor may guide the user with respect to various processes associated with development of the program. For example, the tutor may guide the user with respect to specific code and associated code structures that may be used to develop the program.

BRIEF DESCRIPTION OF DRAWINGS

Features of the present disclosure are illustrated by way of example and not limited in the following figure(s), in which like numerals indicate like elements, in which:

FIG. 3 illustrates a program repair example to illustrate operation of the artificial intelligence-based intelligent programming assistance apparatus of FIG. 1 in accordance with an example of the present disclosure;

FIG. 5 illustrates an auto code completion example to illustrate operation of the artificial intelligence-based intelligent programming assistance apparatus of FIG. 1 in accordance with an example of the present disclosure;

FIG. 6 illustrates a personalized feedback example to illustrate operation of the artificial intelligence-based Intelligent programming assistance apparatus of FIG. 1 in accordance with an example of the present disclosure;

FIG. 7 illustrates a question-answering example to illustrate operation of the artificial intelligence-based intelligent programming assistance apparatus of FIG. 1 in accordance with an example of the present disclosure;

FIG. 13 illustrates a flowchart of an example method for artificial intelligence-based intelligent programming assistance in accordance with an example of the present disclosure.

DETAILED DESCRIPTION

Figure 1:
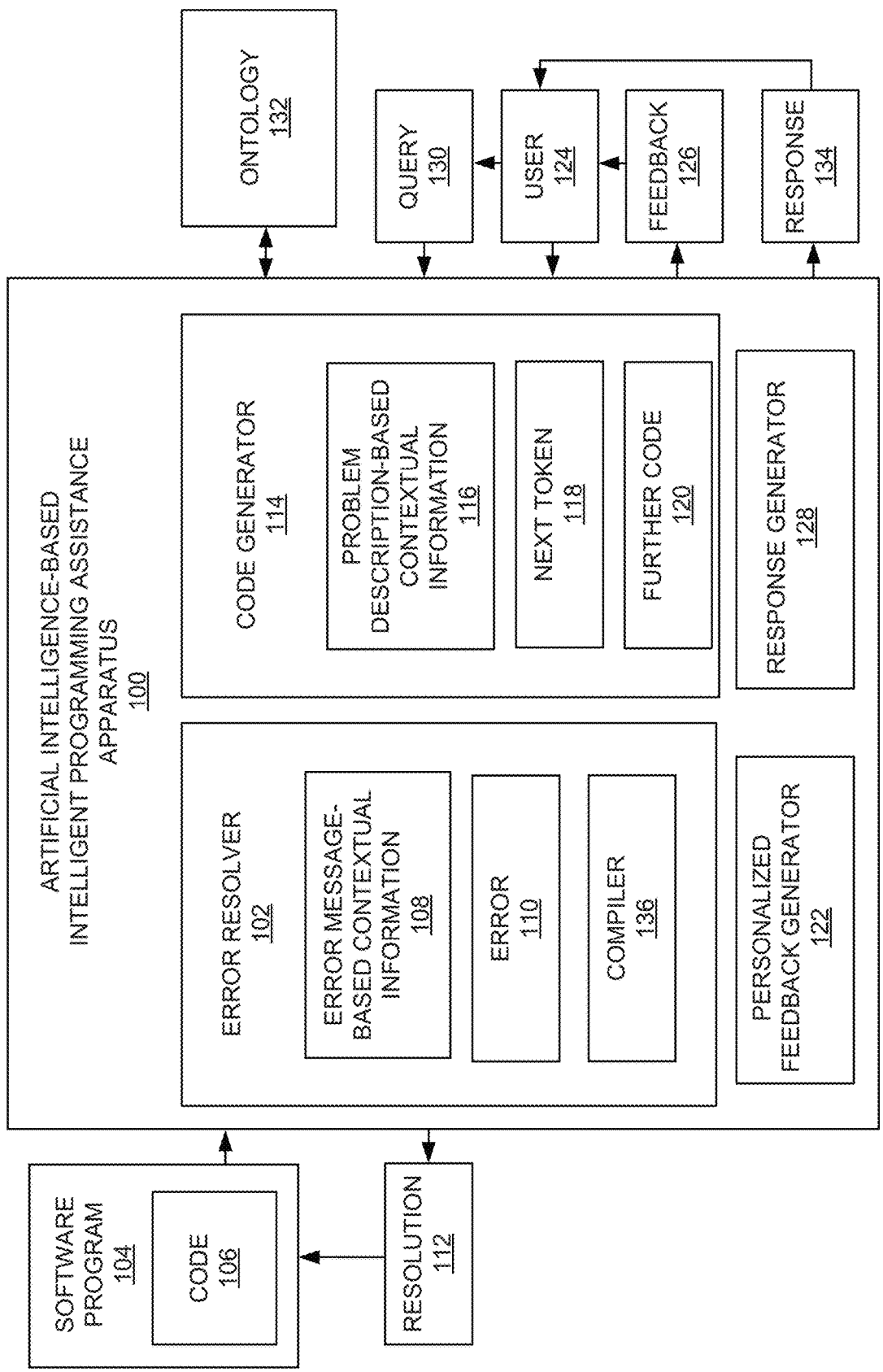
FIG. 1 illustrates a layout of an artificial intelligence-based intelligent programming assistance apparatus hi accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Artificial intelligence-based intelligent programming assistance apparatuses, methods for artificial intelligence-based intelligent programming assistance, and non-transitory computer readable media having stored thereon machine readable instructions to provide artificial intelligence-based intelligent programming assistance are disclosed herein.

In large-scale training centers and other such environments, obtaining feedback from a tutoring assistant or another such person can be infeasible, time consuming, and may present various technical challenges as disclosed herein. Across various courses, queries made by students, trainees, or other such individuals or entities the initial phases of a course may be technically challenging to address in a timely and efficient manner. In some examples, a course may involve solving programming tasks. When a code is compiled and run, the error messages may be technically challenging to understand, and also the errors may not be localized accurately. According to a feature of the apparatuses, methods, and non-transitory computer readable media disclosed herein, based on the error message and the code, programmers, such as novice programmers, may be assisted by providing automatic (e.g., without human intervention) corrections an a program which they are developing. According to another feature of the apparatuses, methods, and non-transitory computer readable media disclosed herein, intelligent code completion may be an important feature for students, trainees, and other such entities because it suggests the next probable code tokens, based on existing code in the context. This may facilitate coding for learners.

The apparatuses, methods, and non-transitory computer readable media disclosed herein address at least the aforementioned technical challenges by predicting what the next token is by analyzing a problem description. The apparatuses, methods, and non-transitory computer readable media disclosed herein provide an artificial intelligence assistant designed to provide services to students, trainees, and other such entities, and teachers, trainers, and other such entities, for example, at classrooms, corporate training centers, and other such locations.

The apparatuses, methods, and non-transitory computer readable media disclosed herein may automatically interact with students, and other such individuals, one on one, similar to a human tutor. The apparatuses, methods, and non-transitory computer readable media disclosed herein may provide the services of program repair, automatic code completion, personalized feedback, and virtual question answering.

The apparatuses, methods, and non-transitory computer readable media disclosed herein further address at least the aforementioned technical challenges by implementing program repair to fix multiple errors in a program by taking a multimodal input into a sequence-to-sequence network.

The apparatuses, methods, and non-transitory computer readable media disclosed herein further address at least the aforementioned technical challenges by providing for automatic code completion, for example, based on the context (e.g., problem description). In this regard, a sequence-to-sequence generative model may be used to generate the next token in the code.

The apparatuses, methods, and non-transitory computer readable media disclosed herein may provide for personalized feedback. In this regard, a summary of the student performance in the assignments, and/or tasks in a course may be provided to a trainer, or another such entity.

The apparatuses, methods, and non-transitory computer readable media disclosed herein may provide for virtual question-answering. In this regard, the apparatuses, methods, and non-transitory computer readable media disclosed herein may generate responses to student introductions, weekly announcements, and frequently asked questions regarding a course.

The apparatuses, methods, and non-transitory computer readable media disclosed herein implement deep neural networks to provide program repair recommendations. The apparatuses, methods, and non-transitory computer readable media disclosed herein implement a learning-based technique to automatically generate fixes for erroneous submissions. A sequence-to-sequence generative model may be used to correct programming errors. A deep neural architecture may incorporate both source code and error messages to repair the program. Error messages may be encoded as an additional context within the model to fix the error.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example artificial intelligence-based intelligent programming assistance apparatus (hereinafter also referred to as "apparatus 100").

Referring to FIG. 1, the apparatus 100 may include an error resolver 102 that is executed by at least one hardware processor (e.g., the hardware processor 1202 of FIG. 12, and/or the hardware processor 1404 of FIG. 14) to ascertain, for a software program 104 that is to be completed, code 106 for the program 104. The error resolver 102 may identify, based on an analysis of the ascertained code 106 and error message-based contextual information 108 associated with the ascertained code 106, an error 110 in the ascertained code 106. The error resolver 102 may generate, based on the identified error 110, a resolution 112 to the identified error 110. The error resolver 102 may modify, based on the generated resolution 112 to the identified error 110, the code 106 for the program 104 to resolve the identified error 110.

According to examples disclosed herein, the error resolver 102 may identify, based on the analysis of the ascertained code 106 and training data concatenated with the error message-based contextual information 108 associated with the ascertained code 106, the error 110 in the ascertained code 106.

According to examples disclosed herein, the error resolver 102 may generate, based on the identified error 110, the resolution 112 to the identified error 110 by generating, based on sequence-to-sequence networks, the resolution 112 to the identified error 110.

According to examples disclosed herein, the error resolver 102 may utilize an encoder and a decoder including recurrent neural network (RNN) layers that are implemented using long short-term memory (LSTM) blocks to identify the error 110 in the ascertained code 106.

According to examples disclosed herein, the error resolver 102 may identify, for the ascertained code 106, code tokens. Further, the error resolver 102 may assign weights to the code tokens based on influence of the code tokens to an output of the program 104.

A code generator 114 that is executed by at least one hardware processor (e.g., the hardware processor 1202 of FIG. 12, and/or the hardware processor 1404 of FIG. 14) may generate, based on an analysis of the ascertained code 106 and problem description-based contextual information 116 associated with the ascertained code 106, a next token 118 associated with the ascertained code 106. The code generator 114 may generate, based on the next token 118 associated with the ascertained code 106, further code 120 for the program 104. The code generator 114 may add the further generated code 120 to the code 106 for the program 104.

According to examples disclosed herein, the code generator 114 may generate, based on the analysis of the ascertained code 106 and training data concatenated with the problem description-based contextual information 116 associated with the ascertained code 106, the next token 118 associated with the ascertained code 106.

According to examples disclosed herein, the code generator 114 may generate a probability of occurrence of the next token 118 associated with the ascertained code 106.

Figure 12:
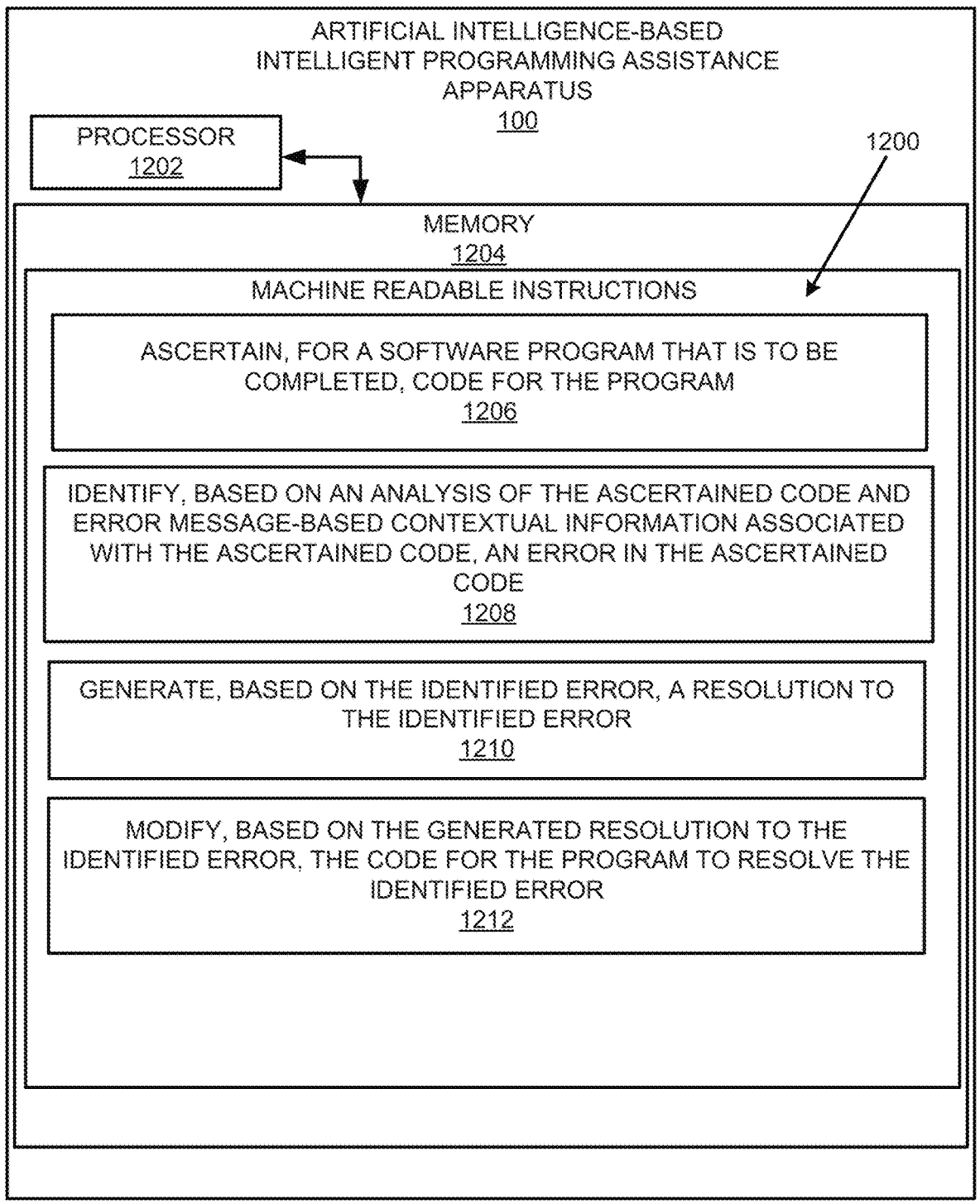
FIG. 12 illustrates an example block diagram for artificial intelligence-based intelligent programming assistance in accordance with an example of the present disclosure.

A personalized feedback generator 122 that is executed by at least one hardware processor (e.g., the hardware processor 1202 of FIG. 12, and/or the hardware processor 1404 of FIG.

14) may analyze, for the program 104, a performance of a user 124 with respect to generation of the code 106 for the program 104. The personalized feedback generator 122 may generate, based on the analyzed performance of the user 124, feedback 126 for the user 124.

According to examples disclosed herein, the personalized feedback generator 122 may cluster errors being made by the user 124 with respect to generation of the code 106 for the program 104 and determine, based on the clustering of the errors, most frequently made errors. Further, the personalized feedback generator 122 may analyze, for the program 104, the performance of the user 124 with respect to the most frequently made errors, and generate, based on the analyzed performance of the user 124, the feedback 126 for the user 124.

A response generator 128 that is executed by at least one hardware processor (e.g., the hardware processor 1202 of FIG. 12, and/or the hardware processor 1404 of FIG. 14) may ascertain, from the user 124, a query 130 associated with the program 104. The response generator 128 may classify, by utilizing an ontology 132, the query 130 into a specified concept of a plurality of concepts. The response generator 128 may generate, based on an analysis of the classified query, a response 134 to the query 130.

Operation of the apparatus 100 is described in further detail with reference to FIGS. 1-11.

Figure 2:
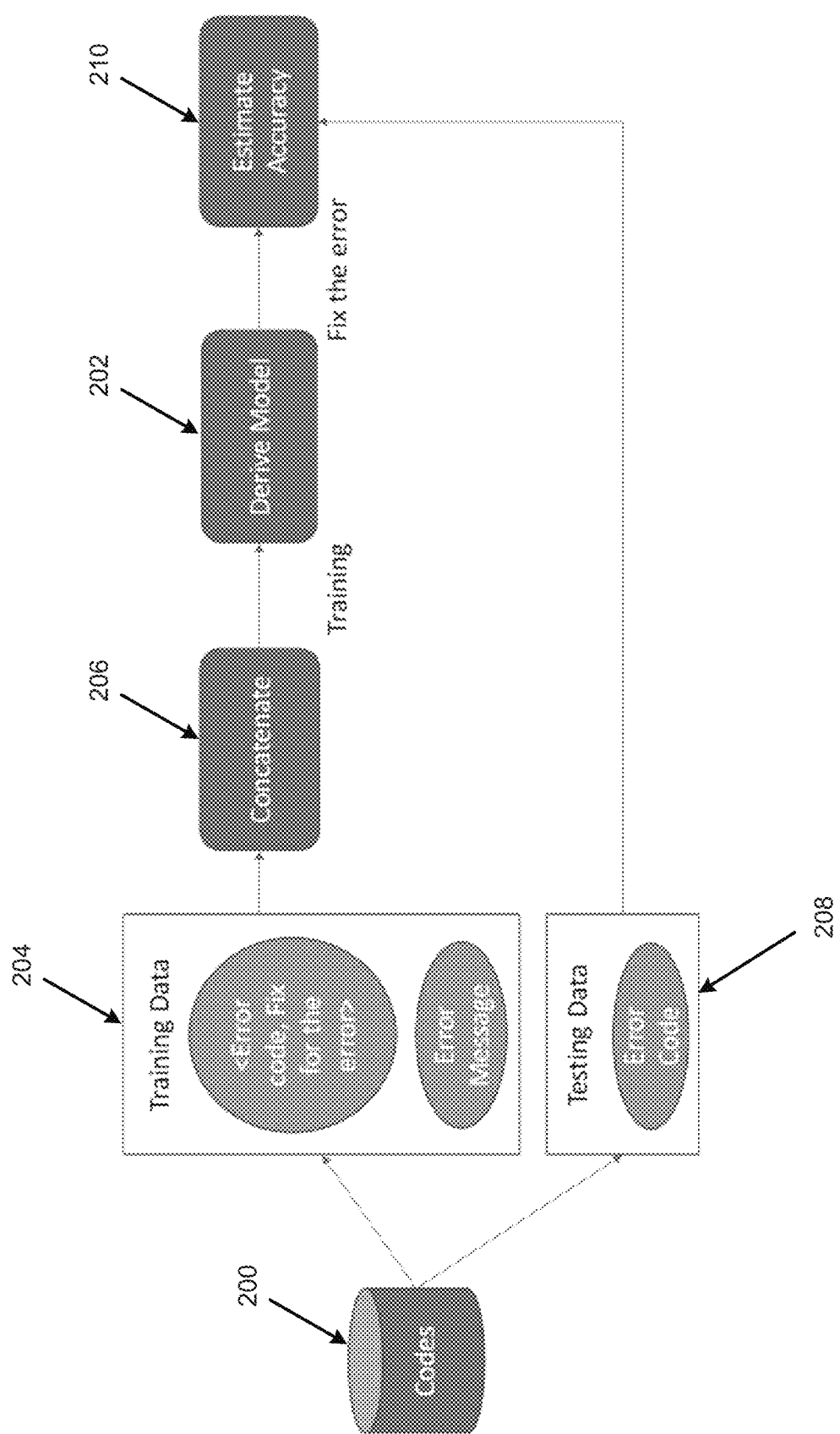
FIG. 2 illustrates a program repair architecture of the artificial intelligence-based intelligent programming assistance apparatus of FIG. 1 in accordance with an example of the present disclosure.

FIG. 2 illustrates a program repair architecture of the apparatus 100 in accordance with an example of the present disclosure.

With respect to program repair, execution of a program may result in different errors. For example, an error may include a compile time error, which includes syntax errors, type checking errors, and compiler crash errors, etc. According to another example, an error may include a runtime error that includes logical errors (e.g., division by zero), dereferencing a null pointer, running out of memory, etc. Given a code and an error message, the error resolver 102 may remedy such errors in a program using sequence-to-sequence networks. In this regard, the error resolver 102 may consider the error message as contextual information to fix an error 110. The error resolver 102 may concatenate a program (e.g., code tokens) with the contextual information (e.g., error message) to resolve an error 110.

Referring to FIG. 2, with respect to program repair, for code received at 200, the error resolver 102 may determine an error resolution model 202 by analyzing training data at 204 to concatenate, at 206, with the contextual information (e.g., error message) to resolve an error 110. The training data at 204 may include an error code, a fix for the error, and an error message. In this regard, the error resolution model 202 may be utilized by the error resolver 102 to generate a fix for the error 110. Test data at 208 may be utilized to determine, at 210, an error of the error resolution model 202. The test data at 208 may include an error code.

FIG. 3 illustrates a program repair example to illustrate operation of the apparatus 100 in accordance with an example of the present disclosure.

Referring to FIG. 3, with respect to program repair, at 300, the error resolver 102 may receive an input program with an undeclared variable in line 18.

At 302, the error message generated by the compiler is shown.

At 304, the error resolver 102 may assign weightage to lines with variable declarations.

At 306, the program after application of the fix suggested by the error resolver is shown.

Figure 4:
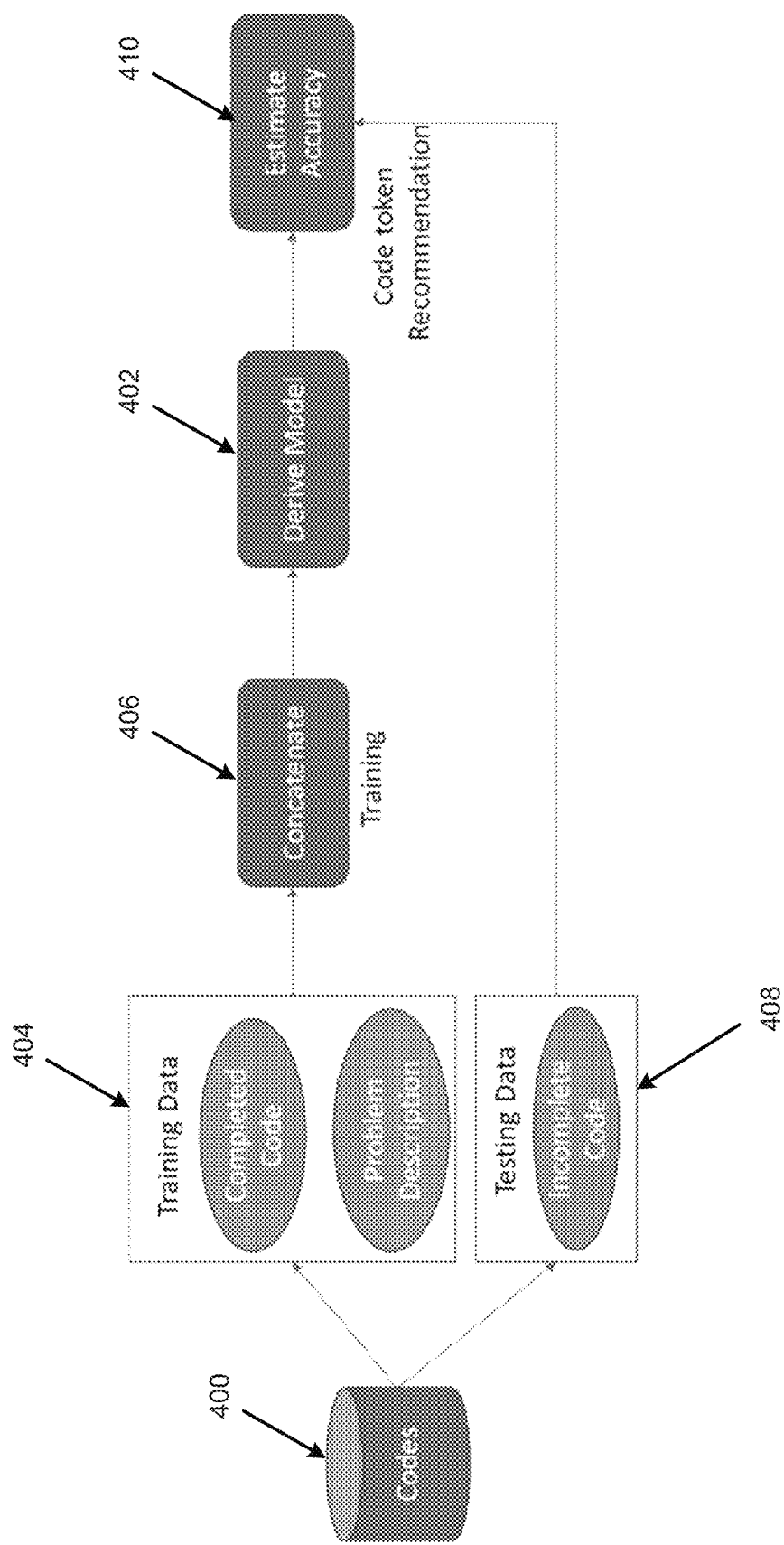
FIG. 4 illustrates an auto code completion architecture of the artificial intelligence-based intelligent programming assistance apparatus of FIG. 1 in accordance with an example of the present disclosure.

FIG. 4 illustrates an auto code completion architecture of the apparatus 100 in accordance with an example of the present disclosure.

With respect to auto code completion, given a code for a particular problem and the description, the code generator 114 may predict a next token. In this regard, the code generator 114 may consider the problem description as the context. In this manner, the generated tokens may be specific to the code. The code generator 114 may utilize a combined representation where the contextual information (e.g., description) is concatenated with program (e.g., code token) as input to the model.

Referring to FIG. 4, with respect to auto code completion, for code received at 400, the code generator 114 may determine a code generation model 402 by analyzing training data at 404 to concatenate, at 406, with the contextual information (e.g., problem description) to generate code. The training data at 404 may include a completed code, and a problem description. In this regard, the code generation model 402 may be utilized by the code generator 114 to generate a code token recommendation. Test data at 408 may be utilized to determine, at 410, an error of the code generation model 402. The test data at 408 may include incomplete code.

Figure 5:
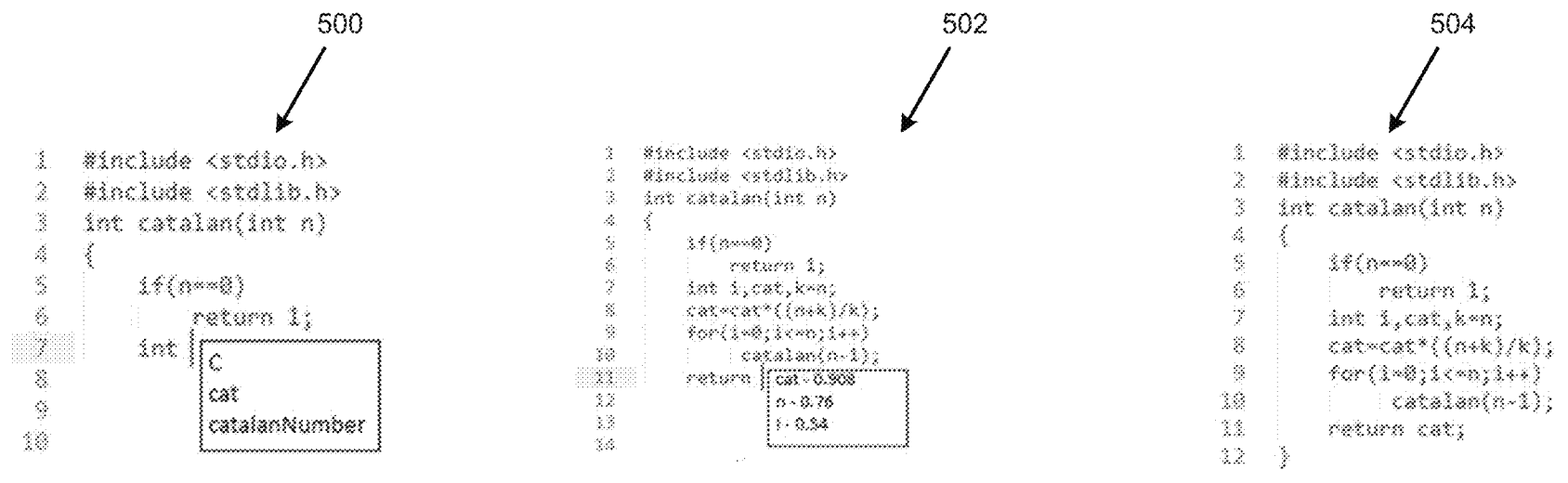

FIG. 5 illustrates an auto code completion example to illustrate operation of the apparatus 100 in accordance with an example of the present disclosure.

With respect to the auto code completion example of FIG. 5, the code generator 114 may program for $n^{th}$ Catalan number. In this regard, Catalan numbers satisfy the following recursive formula:

$$Cn+1 = \sum_{i=0}^{n} CiCn-i$$

Given any n, the code generator 114 may find the Catalan number at that index. For example, the code generator 114 may take the partial program sequence and the next token is predicted based on the prior code tokens.

Referring to FIG. 5 at 500, the code generator 114 may receive incomplete code where the suggestions are given based on the context (e.g., problem description).

At 502, for the incomplete code, the code generator 114 may provide suggestions for a next token, along with the probability of their occurrence.

At 504, completed code may be generated by the code generator 114.

FIG. 6 illustrates a personalized feedback example to illustrate operation of the apparatus 100 in accordance with an example of the present disclosure.

With respect to personalized feedback, the personalized feedback generator 122 may provide feedback for every student to a trainer based on the student's performance in the tasks during a course. In this regard, the personalized feedback generator 122 may cluster (e.g., by K-means clustering) the errors that the student is making and then provide feedback with the type of errors the student is frequently making. For example, if the student is making many errors in syntax, the personalized feedback generator 122 may generate feedback 126 indicating that the student needs to improve in that concept. Similarly, if there is a student who has made several errors in logic of a program, the personalized feedback generator 122 may generate feedback 126 indicating that the student has to improve in logic.

Referring to FIG. 6, the programs shown in FIG. 6 may be written by user 435 for six different problems. It can be seen that most of these errors are syntax errors. The feedback sent to the tutoring assistant by the personalized feedback generator 122 may be "Though the student writes the correct logic, there are too many syntax errors. And Hence, should be working on reducing the same."

FIG. 7 illustrates a question-answering example to illustrate operation of the apparatus 100 in accordance with an example of the present disclosure.

With respect to question-answering implemented by the response generator 128, given a student's question (e.g., query 130 as disclosed herein), the response generator 128 may map the question into relevant concepts. The response generator 128 may utilize the concepts as an index to retrieve an associated answer from the episodic memory of questions organized into categories. In order to search for answers efficiently, the response generator 128 may utilize a representation, a way to depict the properties and features of a question. In this regard, an ontology of the concepts may be built for representing questions. The ontology may then be used by the response generator 128 for classification of questions into different concepts.

Referring to FIG. 7, the set of such questions and answers may be trained on the response generator 128, The subject of the question may be used as an index. Whenever a new question (e.g., query) is posted, the response generator 128 may search the question via the subject, and display the corresponding answer.

Figure 8:
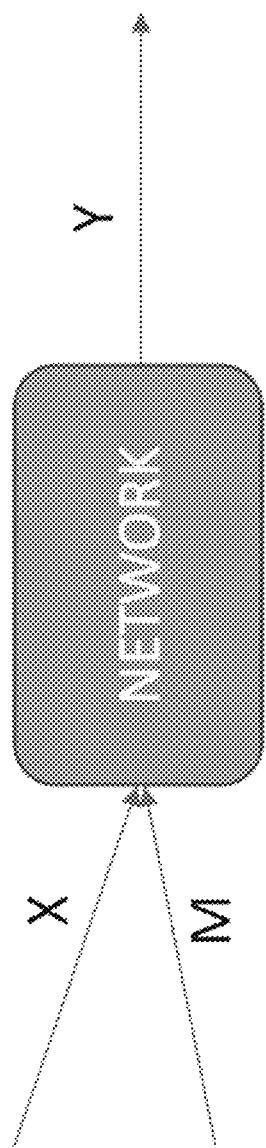
FIG. 8 illustrates a program representation of the artificial intelligence-based intelligent programming assistance apparatus of FIG. 1 in accordance with an example of the present disclosure.

FIG. 8 illustrates a program representation of the apparatus 100 in accordance with an example of the present disclosure.

Referring to FIG. 8, for the apparatus 100, integers may be represented as NUM, strings (STR) may be represented as end of a token sequence (EOS). An input may include a sequence of tokens (X) and an error message (M). An output may include a sequence of tokens (Y) (e.g., fixes errors in X). A program P with k lines may be represented as $(l_1, s_1)$, $(l_2, s_2), \ldots, (l_k, s_k)$<EOS>, where $l_1, l_1, \ldots, l_k$ are line numbers, and $s_1, s_2, \ldots, s_k$ are token sequences for statements at the respective lines, FIG. 9 illustrates pre-processing steps of the apparatus 100 in accordance with an example of the present disclosure.

Figure 9:
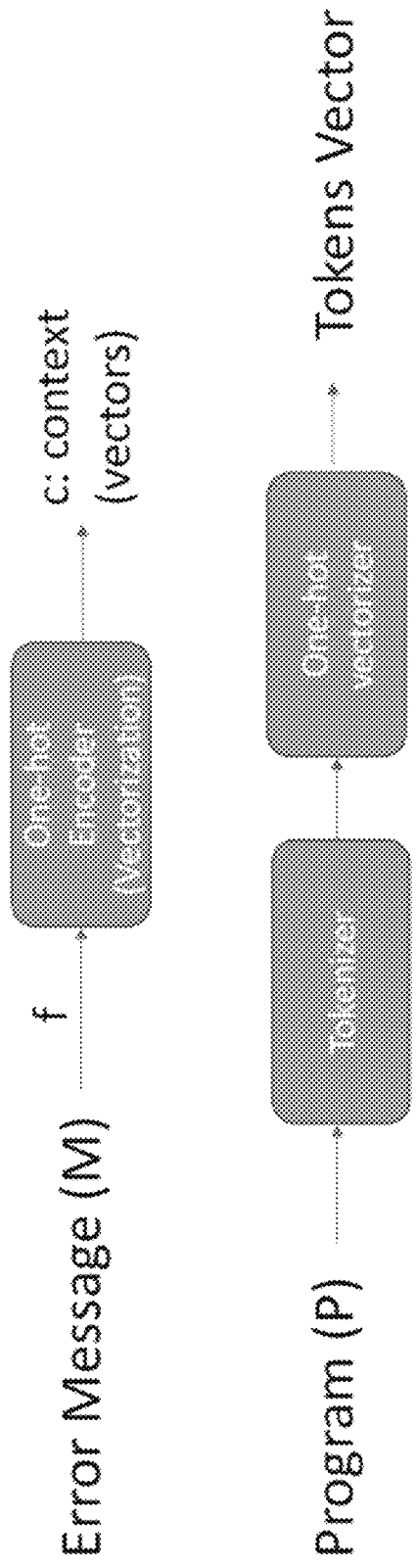
FIG. 9 illustrates pre-processing steps of the artificial intelligence-based intelligent programming assistance apparatus of FIG. 1 in accordance with an example of the present disclosure.

Referring to FIG. 9, with respect to pre-processing, in order to process the inputs in the network, the inputs may be pre-processed as shown (e.g., <NUM> <STR> <SYM> 0.

With respect to pre-processing, assuming that line 20 in program P4 specifies int temp=2, pre-processing may include:

Tokenization: keyword('int'), identifier('temp'), Punctuator('='), Numeric('2'), Punctuator(';')
Vocab normalization: int identifier=Numeric, v
Assuming vocab indices: identifier=4, Numeric=0, int='='=10, ';'=9
Vectorization: [3, 4, 10, 0, 9]=>One hot vectorization may be performed
Every line in the program P4 may be similarly tokenized and represented as $(l_1, s_1), (l_2, s_2), \ldots, (l_n, s_n)$, where n is the number of lines in program P4, and $l_i$ are the line numbers, and $s_i$ are the tokenized sequence for line $l_i$.

Figure 10A:
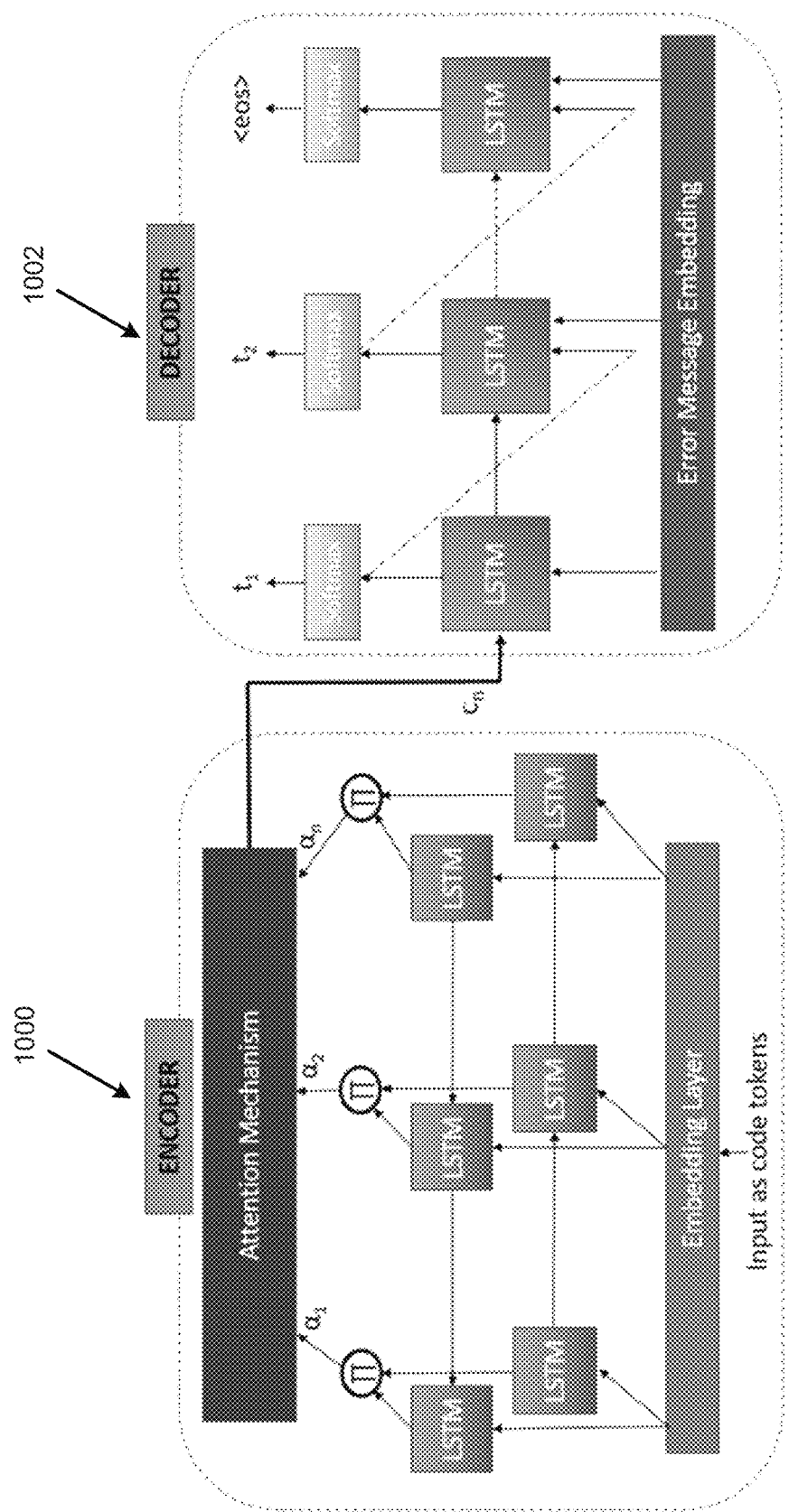
FIGS. 10A-10O illustrate a model architecture of an error resolver of the artificial intelligence-based intelligent programming assistance apparatus of FIG. 1, and strategy layouts for the error resolver.

FIGS. 10A-10O illustrate a model architecture of the error resolver 102, and strategy layouts for the error resolver 102, in accordance with an example of the present disclosure.

Referring to FIG. 10A, with respect to model setup, the error resolver 102 may utilize a many-to-many sequence model where the input is a sequence of tokens with a dynamic length, and the output is also a sequence with some dynamic length. A token may represent an individual entity. For example, for piece of code - - - int temp=2, the tokens are keyword('int'), identifier('temp'), Punctuator('='), Numeric('2'), and Punctuator(';'). With respect to dynamic length, different programs may have variable length (in terms of number of tokens), Both input programs and generated output program will have variable length (e.g., not fixed for the entire program code in the training and test set), A sequence-to-sequence model may include an encoder 1000, and a decoder 1002. In this regard, the error resolver 102 may be based on the sequence-to-sequence model, and utilize both the code 106 and the error 110 to repair the software program 104. Both the encoder and the decoder may include recurrent neural network (RNN) layers that are implemented using long short-term memory (LSTM) blocks. In the sequence-to-sequence model, the encoder may process the input sequence into a fixed representation that is fed into the decoder as a context. The decoder may then decode the processed information into an output sequence, Along with the input context, an additional context may be passed in the decoder by concatenating with the input context. The context may include the error message in the program.

Referring to FIG. 10A, the sequence-to-sequence model may include the encoder 1000 and the decoder 1002, Both the encoder and the decoder may be a variant of a Recurrent Neural Network (RNN) in which layers are implemented using LSTM or Gated Recurrent Units (GRU) blocks. The encoder may process the input sequence into a fixed representation that is fed into the decoder as a context vector. The decoder may decode the processed information into an output sequence, Along with the input token sequence, additional context information may be passed to the decoder by concatenating it with the input context. The additional context may include the error message that is generated on compiling the program. Not all code tokens may be relevant while predicting the correct tokens to fix errors. The attention mechanism as disclosed herein may provide higher weights to the tokens which influence the output. The decoder may concatenate the context vector and error information to predict the correct token. The error message may contain vital contextual information about what kind of error is present in the code. For each step in the target side, hidden units may be obtained by combining the representation produced by the target LSTM at the previous timestep, the word representations at the current timestep, and the error embedding. A softmax layer may predict the correct token that will fix the error. A cross-entropy may be determined over the softmax layer outputs at each timestep of the decoder and summed over the output sequence to determine the loss function.

With respect to the encoder 1000, for an input sequence $(x_1, x_2, x_n)$, the hidden unit at each time step $h^t$ is given as $$h^t = f(h^{t-1}, x^t),$$

where f is a non-linear activation function (e.g., LSTM.

In some examples, a bidirectional LSTM (BiLSTM) may be used as the encoder 1000, which may be utilized in applications such as speech recognition, machine translation etc.

With respect to model setup, given a sequence of paired inputs $X=\{(x_t, c)\}$, $t=1 \ldots T$, $x_t$ may represent one-hot encoded token vectors at time step t, and c may represent the error message as context vectors. In this regard, an objective may include producing likely continuations of token sequences, using them as a recommendation for fixing errors in a program, and predicting a probable next token for the program. To this end, a probability distribution over sequences p(X) may be defined. The joint probability p(Y|X) may be decomposed using the chain rule into a product of conditional probabilities. The LSTM may define a distribution over outputs, and may sequentially predict code tokens using a Softmax function as follows:

$$P(Y \mid X) = \prod_{t=1}^{T} p(y_t \mid c_t, x_1, c_{<t})$$

With respect to the attention mechanism, when predicting the correct token to fix the error, not all of the code tokens may be relevant for prediction. In this regard, an attention mechanism may provide higher weights to the tokens that influence the output. The weights may be learnt by the model while predicting the correct token to fix the error. For example, hi FIG. 3 at 304, the underlined tokens have higher weights to predict the correct fix. At each time step 't' in the decoding phase, both approaches may first utilize as input the hidden state $h_t$ at the top layer of a stacking LSTM, and then derive a context vector $c_t$ that captures relevant source-side information to predict the current target word. The decoder may pay more attention to the states that help in predicting the tokens. In this regard, when a decoder is predicting certain tokens at each timestep 't', the hidden states may be weighted by attention weights to generate the context vector for that timestep 't'. These attention weights may be learnt by the model capturing the importance (in terms of weights) given to each encoder hidden states while predicting the token at decoder any timestep.

With respect to the aforementioned attention layer, the attention mechanism may address the limitation of modeling long dependencies and efficient usage of memory for computation. The attention mechanism may intervene as an intermediate layer between the encoder and the decoder, with the objective of capturing the information from the sequence of tokens that are relevant to the contents of the sentence. Unlike the encoder-decoder model that uses the same context vector for every hidden state of the decoder, the attention mechanism may determine a new vector $c_t$ for the output word $y_t$ at the decoding timestep t. The context vector dr may then be determined as a weighted sum of hidden states as follows:

$$c_t = \sum_{j=1}^{n_x} \alpha_{tj} h_j$$

where $h_j$ is the hidden state of the input sequence $x_j$, $\alpha_{tj}$ is the weight of $h_j$ for predicting $y_t$, and $n_x$ is the number of hidden sequence. This vector may also be denoted the attention vector as follows:

$$\alpha_{ij} = \frac{\exp(e_{ij})}{\sum_{k=1}^{n} \exp(e_{ik})}$$

where $\exp(e_{ij})$ is a parameterized alignment model which scores how well the inputs around position 'j' and the output at position 'i' match.

This context vector $c_t$ may be used by a learnable function to allow each output token $y_t$ to pay "attention" to different encoder hidden states when predicting a token.

With respect to an output, the decoder may concatenate the context vector and error information to predict the correct token. The error message may include vital contextual information about what kind of error is present in code. This information may be utilized to internally classify the errors, in order to increase error prediction accuracy. Each error message may be represented as a vector embedding that influences the generation of responses. In this manner, information about the error may be encoded and injected into the hidden layer at each time step to thus facilitate fixing of the errors throughout the generation process. For each step in the target side, hidden units may be obtained by combining the representation produced by the target LSTM at the previous time step, the word representations at the current time step, and the error embedding. The softmax layer may predict the correct token that will fix the error. In this regard, at each timestep of decoder, model (LSTM cell) generates the score. These scores may be transformed into probabilities using softmax layer. These probability values may correspond to each token in vocabulary. The token with the highest probability may be considered as output for that timestep. The softmax may represent a function which transforms a real number into a probability distribution. The cross-entropy may be determined over the softmax layer outputs at each time step, and summed over the output sequence to compute the loss function.

$$p_y = \prod_{i=1}^{T} p(y_t \mid y_1, y_2, \cdots, y_{t-1}, c_t, e_t)$$

$$p(y_t \mid y_1, y_2, \cdots, y_{t-1}, c, e_t) = q(y_{t1}, h_t, c_t, e_t)$$

The output at each timestep of decoder (yt) is conditioned by outputs of prior timesteps (y1, y2 . . . , yt−1), error message embedding, and the context vector from encoder for that timestep. The decoder may define a probability over the output y ($p_y$) by decomposing the joint probability.

With respect to the decoder, the hidden states of the decoder network may be initialized with the final states of the encoder network (e.g., context vector $c_t$). The hidden state of the decoder at timestep t may be determined as follows:

$$h^t = g(h^{t-1}, x^t)$$

where g( ) is a non-linear activation function (e.g., LSTM).

The error message may be utilized as one of the inputs to the decoder to generate the output $y_t$ based on the context vector $c_t$ and previous timestep output $y_{t-1}$. The decoder may define a probability over the output y ($p_y$) by decomposing the joint probability as follows:

$$p_y = \prod_{t=1}^{T} p(y_t \mid y_1, y_2, \cdots, y_{t-1}, c_t, e_t)$$

$$p(y_t \mid y_1, y_2, \cdots, y_{t-1}, c, e_t) = q(y_{t1}, h_t, c_t, e_t)$$

where q( ) is a non-linear activation function (e.g., softmax), $h_t$ is the hidden unit activation, and $e_t$ is the error embedding vector at time step 't'.

With respect to operation of the error resolver 102, text for a software program 104 may include different types of tokens such as types, keywords, special characters (e.g., semicolons), functions, literals, and variables. These tokens may be mapped to unique IDs. The software program 104 may be broken down into several lines where each line includes of a sequence of tokens. Each software program 104 may be represented as $(l_1, s_1, e_1), (l_2, s_2, e_2), \ldots, (l_n, s_n, e_n)$, where n is the number of lines in the program, $l_i$ is the line number, $s_i$ is the tokenized sequence for line $l_i$, and $e_i$ is the error message encoding for line $l_i$.

Embeddings of program tokens and error messages may be passed to the sequence-tri-sequence model. The sequence-to-sequence model may generate the potential fix using Softmax probabilities by predicting the correct tokens for that timestep, where the decoder generates the potential tokens sequentially. The fix may be applied to the software program 104 by replacing $s_i$ at $l_i$ with $s'_i$, where $s'_i$ is the ", area" in the modified code.

Figure 10B:
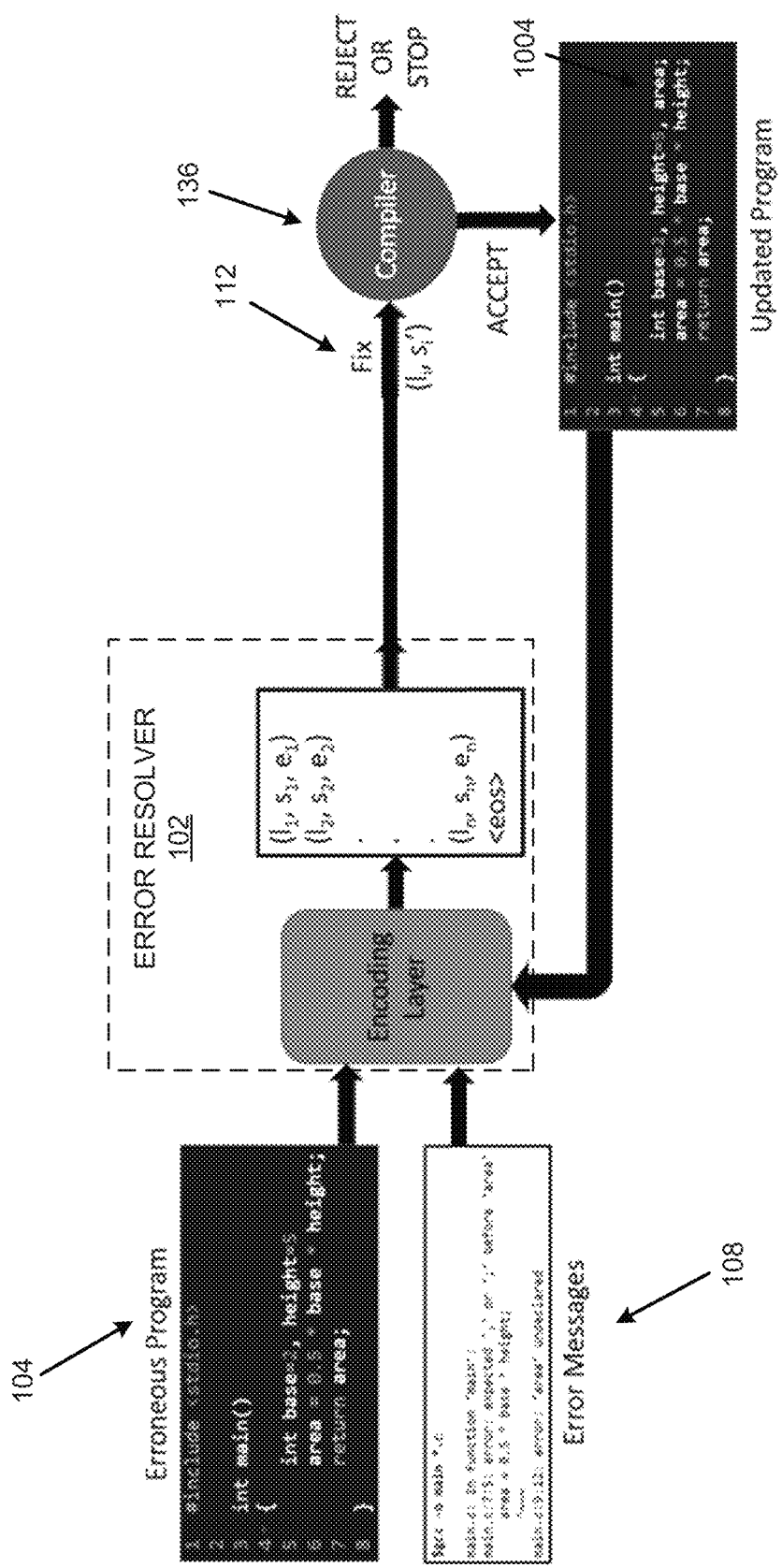
FIG. 10D illustrates a template, in accordance with an example of the present disclosure.
Figure 10C:
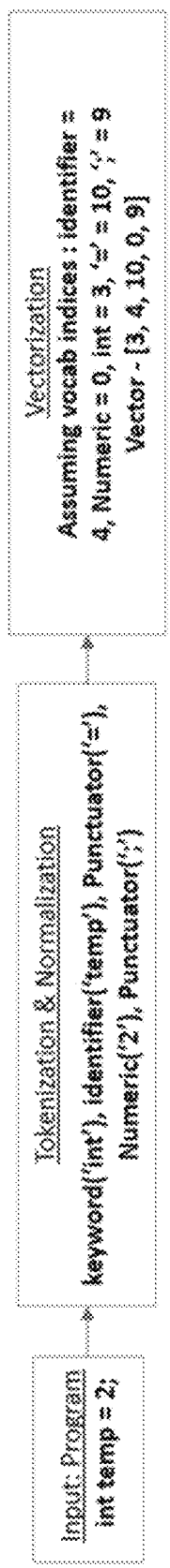

Referring to FIG. 10B, the error resolver 102 may ascertain, for the software program 104 that is to be completed, code 106 for the program 104. The error resolver 102 may identify, based on an analysis of the ascertained code 106 and error message-based contextual information 108 associated with the ascertained code 106, an error 110 in the ascertained code 106. The error resolver 102 may generate, based on the identified error 110, a resolution 112 to the identified error 110. The error resolver 102 may modify, based on the generated resolution 112 to the identified error 110, the code 106 for the program 104 (e.g., the updated program) to resolve the identified error 110. The error resolver 102 may include or otherwise utilize a compiler 136 (e.g., GNU Compiler Collection (GCC)) to determine if the recommended fix is correct or incorrect. As disclosed herein, the error resolver 102 may utilize an encoder and a decoder including RNN layers that are implemented using LSTM blocks to identify the error 110 in the ascertained code 106.

The error resolver 102 may analyze the program and error message to iteratively fix the error. The program and error message may be passed through the encoding layer. The program may be treated as a sequence of tokens X, where another sequence Y may be produced such that Y is a repaired version of X. Program text may include different kinds of tokens such as types, keywords, special characters (e.g., semicolons), functions, literals, and variables. These tokens may be mapped to unique identifications (IDs). A program may be broken down into several lines where each line includes a sequence of tokens. Each program may be represented as $(l_1, s_1, e_1), (l_2, s_2, e_2), \ldots, (l_n, s_n, e_n)$ where n is the number of lines in the program, $l_i$ is the line number, $s_i$ is the tokenized sequence for line and $e_i$ is the error message encoding for line $l_i$.

Referring to FIG. 10O, the process of encoding a single line of program is shown. Here, 'int temp=2;' is encoded as a vector {3, 4, 10, 0, 9], A similar process is applied to all the lines of a program (Note: The vocabulary indices shown in the figure are for explaining the concept). For each program, the encoding layer also generates a one-hot encoding vector of the error messages. For the lines having no error, '0' is passed as an encoded value for the error message, Embeddings of program token and error message may be passed to the error resolver 102. The error resolver 102 may generate the potential fix $\hat{y}=(l_i, s^i)$ using softmax probabilities. The fix may be applied to the program by replacing $s_i$ at $l_i$ with $s^i$. The updated program may then be passed through the compiler 136 which accepts or ejects the fix. If the potential fix reduces the number of errors and does not induce any new errors, then the fix is accepted, else at as rejected. After applying the fix on the input program, the updated program is passed to the error resolver 102 again to resolve other errors. The iteration continues until the error resolver 102 fixes all the errors, or the compiler rejects the fix, or a predefined number of iterations is reached.

The error resolver 102 may learn error repair strategies from the training data that includes several pairs of programs, where one program in the pair fails to compile and the other program in the pair is free of compilation errors. The error resolver 102 may repair programs in which multiple lines require repairs. With every such program pair, an error message generated by the compiler may be received. Errors reported by two different programs, such as, "8:9: error: 'i' undeclared (first use in this function) for(i=0; i<n; i++)" and "error: 'count' undeclared (first use in this function) if (count==0)", may fail in one category itself "variable not declared before it's use". A template may be defined for each unique type of error messages present in the datasets. The error messages may be mapped based on the defined template. For example, all error messages with 'variable declaration' may be mapped to "Use of undeclared identifier" (Error code—E1).

For each software program 104, the encoding layer also generates a one-hot encoding vector of the error messages. For the lines having no error, an encoded value of '0' may be passed for the error message.

The error resolver 102 may learn error repair strategies from the training data that includes several pairs of programs, where one program in the pair fails to compile and the other program in the pair is free of compilation errors. Even for the same type of error message, their representation in the compiler error message may be different because of the inclusion of program-specific tokens such as identifiers, keywords, etc., in error messages.

Errors reported by two different programs [8:9: error: 'i' undeclared (first use in this function) for(i=0; i<n; i++)] and [error: 'count' undeclared (first use in this function) if (count==0)] may fall in one category itself of "variable not declared before it's use".

As shown in FIG. 10D, a template may be defined for each unique type of error messages present in datasets. The mapping of error messages may be performed based on the defined template. For FIG. 10D, top five error messages along with their frequency of occurrence and repair accuracy is shown, and the symbol may represent a placeholder for program-specific tokens such as identifiers, reserved keywords, punctuation marks, etc.

The dataset may include C programs for a specified number (e.g., 93) of different programming tasks with a specified number (e.g., 6,971) erroneous programs. These programs may be collected using a system that stores intermediate versions of programs, in addition to final submissions. The dataset may include two classes of programs, programs that compile and programs that do not compile.

For h dataset, a random sample of $(P_e, P_c)$ program pairs along with the compiler error message $M_c$ for $P_e$ may be selected, where $P_e$ is a version of a programmer's program which fails with at least one compiler error, $P_c$ is a later version of the attempt by the same programmer which does not produce any compilation errors, and $M_c$ is the error message captured during the compilation of the program $P_e$.

In order to test operation of the error resolver 102, an experimental setup may be implemented to include a network that includes four layers of LSTM cells with 300 units in each layer. A dropout of 0.2 may be utilized after each layer, along with an optimizer with batch size 30, learning rate 0.001, and gradient clipping 1. In order to encode the program into the network, the programs may be tokenized and converted into 50-dimensional vectors using the embedding layer. A one-hot encoding of the error message may be generated for each program. The sequence-to-sequence model may be trained for up to 40 epochs, and the model with the best performance on the test set may be selected.

With respect to evaluation of the experimental setup, repair accuracy may be used as a metric to evaluate the performance of the error resolver 102. Repair accuracy may be defined as the fraction of fixes corrected out of all the errors. In one example; repair accuracy may be measured for two types of fixes: a) complete fixes: programs that are completely fixed, and b) partial fixes: programs that are partially fixed, Results of utilization of the error resolver 102 may include a relatively high repair accuracy for both types of fixes.

With respect to results, given the representation of the input to the model $(l_1, s_1), (l_2, s_2) \ldots (l_n, s_n)$, the error resolver 102 may predict $(l_k, s'_k)$ to fix the error (e.g., replace $s_k$ by $s'_k$ at line $l_k$). For example, for FIG. 10B, $s'_k$ may represent "area" as shown at 1004. The error resolver 102 may then update the program by fixing the suggested errors by the model. In this regard, as shown in FIG. 10B, a compiler 136 (e.g., GNU Compiler Collection (GCC)) may be utilized to determine if the recommended fix is correct or incorrect. This approach may be used to recursively fix multiple errors in a program.

With respect to auto code completion, a sequence of fixed set of code tokens and information about the program as context may be passed as an input to the error resolver 102. The similar architecture may be used for predicting the next token in the code. However, instead of using an error message as an input to the decoder, the program details may be used as context. In this regard, the Softmax layer in the decoder may predict the next token in the program.

Figure 11:
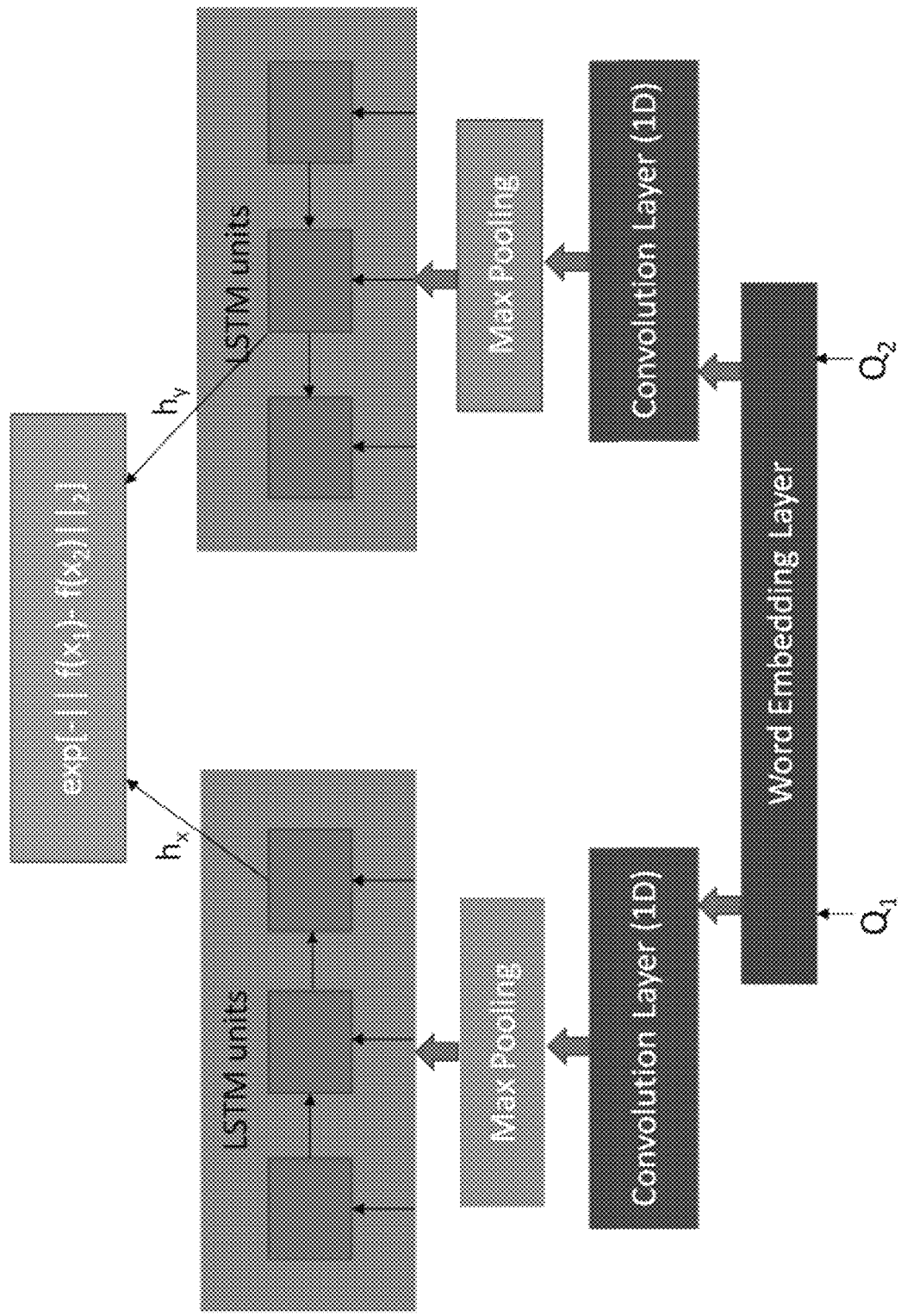
FIG. 11 illustrates a question-answering model architecture of the artificial intelligence-based intelligent programming assistance apparatus of FIG. 1 in accordance with an example of the present disclosure.

With respect to data collection, for training and evaluation for programming tasks, for examples disclosed herein, C programs written by students for 93 different programming tasks may be utilized in an introductory programming course. The programs may be captured through a web-based tutoring system, FIG. 11 illustrates a question-answering model architecture of the apparatus 100 in accordance with an example of the present disclosure.

With respect to question-answering model architecture, the network may capture whether two questions are similar or not. If the newly posted question is similar from the existing set of questions, then the model may retrieve the question similar to the posted question. The answer of the similar question may be provided as a suggestion to the user. The network may include two identical subnetworks including the same parameters and weights.

With respect to model architecture details, each question may be represented as word embeddings. The word vector of each question may be passed to the convolution layer. The convolution layer may extract the relevant features from the text and pass it to LSTM layer which preserves the sequential information. The LSTM layer may determine the hidden unit activation for both of the networks. The network may determine the distance (L2 norm) between the encodings of two inputs $h_x$ and $h_y$. The distance may represent the similarity between two encodings $h_x$ and $h_y$.

The sequence-to-sequence model may be modified to incorporate error messages to fix the error. In order to evaluate the effectiveness of the error resolver 102, a sequence-to-sequence model may be built using a Bidirectional LSTM network with attention mechanism. This network may consider only the program tokens as input (without the error message). A program is represented as $(l_1, s_1), (l_2, s_2), \ldots, (l_n, s_n)$, where n is the number of lines program, $l_i$ is the line number, and $s_i$ is the tokenized sequence for line $l_i$. Repair accuracy may be observed to increase by at least 10% to 40% for complete fixes as well as partial fixes.

Figure 14:
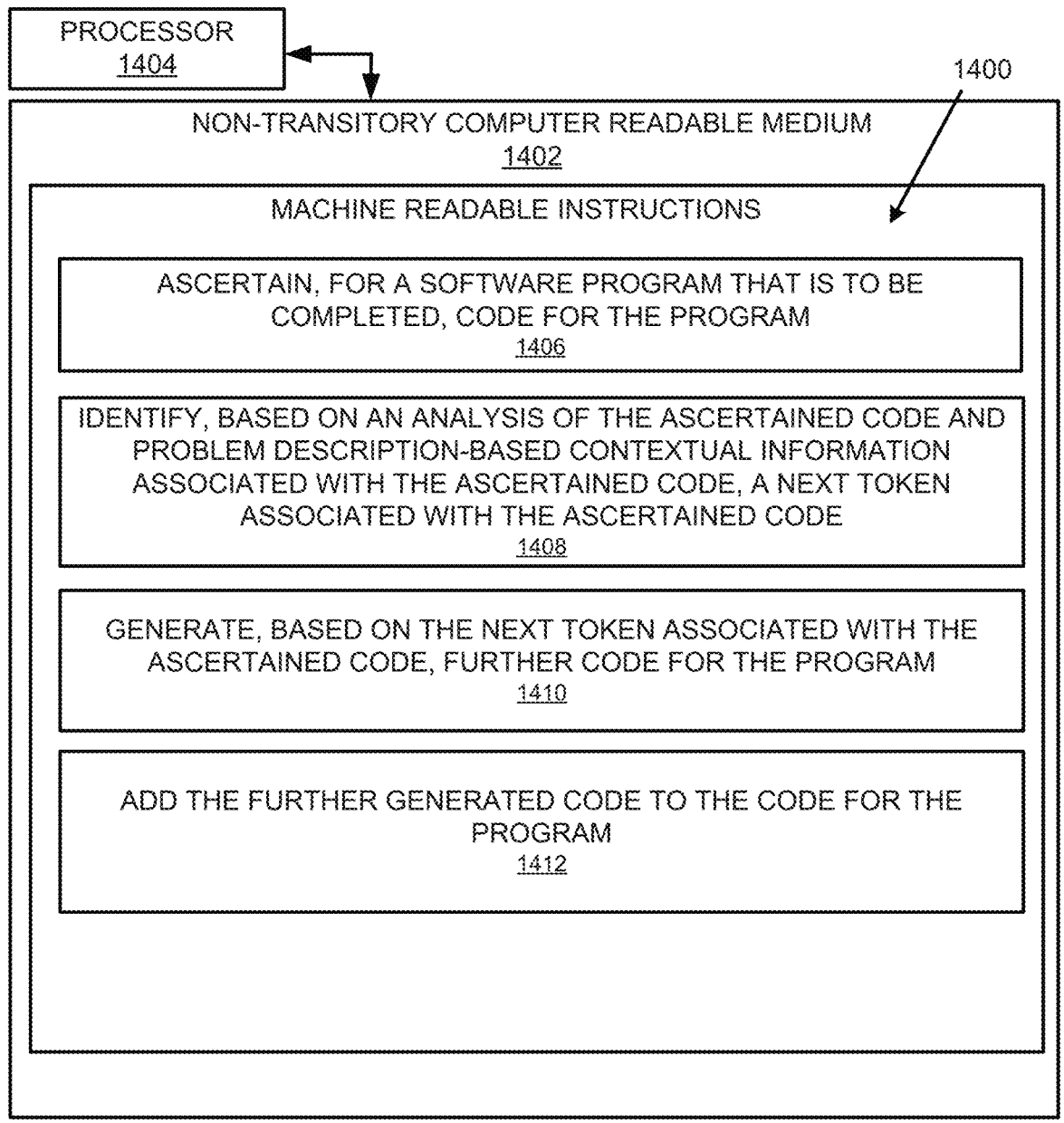
FIG. 14 illustrates a further example block diagram for artificial intelligence-based intelligent programming assistance in accordance with another example of the present disclosure.

FIGS. 12-14 respectively illustrate an example block diagram 1200, a flowchart of an example method 1300, and a further example block diagram 1400 for artificial intelligence-based intelligent programming assistance, according to examples. The block diagram 1200, the method 1300, and the block diagram 1400 may be implemented on the apparatus 100 described above with reference to FIG. 1 by way of example and not of limitation. The block diagram 1200, the method 1300, and the block diagram 1400 may be practiced in other apparatus. In addition to showing the block diagram 1200, FIG. 12 shows hardware of the apparatus 100 that may execute the instructions of the block diagram 1200. The hardware may include a processor 1202, and a memory 1204 storing machine readable instructions that when executed by the processor cause the processor to perform the instructions of the block diagram 1200. The memory 1204 may represent a non-transitory computer readable medium. FIG. 13 may represent an example method for artificial intelligence-based intelligent programming assistance, and the steps of the method. FIG. 14 may represent a non-transitory computer readable medium 1402 having stored thereon machine readable instructions to provide artificial intelligence-based intelligent programming assistance according to an example. The machine readable instructions, when executed, cause a processor 1404 to perform the instructions of the block diagram 1400 also shown in FIG. 14.

The processor 1202 of FIG. 12 and/or the processor 1404 of FIG. 14 may include a single or multiple processors or other hardware processing circuit; to execute the methods, functions and other processes described herein. These methods, functions and other processes may be embodied as machine readable instructions stored on a computer readable medium, which may be non-transitory (e.g., the non-transitory computer readable medium 1402 of FIG. 14), such as hardware storage devices (e.g., RAM (random access memory), ROM (read only memory), EPROM (erasable, programmable ROM), EEPROM (electrically erasable, programmable ROM), hard drives, and flash memory). The memory 1204 may include a RAM, where the machine readable instructions and data for a processor may reside during runtime.

Referring to FIGS. 1-12, and particularly to the block diagram 1200 shown in FIG. 12, the memory 1204 may include instructions 1206 to ascertain, for a software program 104 that is to be completed, code 106 for the program 104.

The processor 1202 may fetch, decode, and execute the instructions 1208 to identify, based on an analysis of the ascertained code 106 and error message-based contextual information 108 associated with the ascertained code 106, an error 110 in the ascertained code 106.

The processor 1202 may fetch, decode, and execute the instructions 1200 to generate, based on the identified error 110, a resolution 112 to the identified error 110.

The processor 1202 may fetch, decode, and execute the instructions 1212 to modify, based on the generated resolution 112 to the identified error 110, the code 106 for the program 104 to resolve the identified error 110.

Referring to FIGS. 1-11 and 13, and particularly FIG. 13, for the method 1300, at block 1302, the method may include ascertaining, for a software program 104 that is to be completed, code 106 for the program 104.

At block 1304, the method may include identifying, based on an analysis of the ascertained code 106 and error message-based contextual information 108 associated with the ascertained code 106, an error 110 in the ascertained code 106.

At block 1306, the method may include generating, based on the identified error 110, a resolution 112 to the identified error 110.

At block 1308, the method may include modifying, based on the generated resolution 112 to the identified error 110, the code 106 for the program 104 to resolve the identified error 110.

At block 1310, the method may include generating, based on an analysis of the ascertained code 106 and problem description-based contextual information 116 associated with the ascertained code 106, a next token 118 associated with the ascertained code 106.

At block 1312, the method may include generating, based on the next token 118 associated with the ascertained code 106, further code 120 for the program 104.

At block 1314, the method may include adding the further generated code 120 to the code 106 for the program 104.

At block 1316, the method may include analyzing, for the program 104, a performance of a user 124 with respect to generation of the code 106 for the program 104.

At block 1318, the method may include generating, based on the analyzed performance of the user 124, feedback 126 for the user 124.

At block 1320, the method may include ascertaining, from the user 124, a query 130 associated with the program 104.

At block 1322, the method may include classifying, by utilizing an ontology 132, the query 130 into a specified concept of a plurality of concepts.

At block 1324, the method may include generating, based on an analysis of the classified query, a response 134 to the query 130.

Referring to FIGS. 1-11 and 14, and particularly FIG. 14, for the block diagram 1400, the non-transitory computer readable medium 1402 may include instructions 1406 to ascertain, for a software program 104 that is to be completed, code 106 for the program 104.

The processor 1404 may fetch, decode, and execute the instructions 1408 to identify, based on an analysis of the ascertained code 106 and problem description-based contextual information 116 associated with the ascertained code 106, a next token 118 associated with the ascertained code 106.

The processor 1404 may fetch, decode, and execute the instructions 1410 to generate, based on the next token 118 associated with the ascertained code 106, further code 120 for the program 104.

The processor 1404 may fetch, decode, and execute the instructions 1412 to add the further generated code 120 to the code 106 for the program 104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An artificial intelligence-based intelligent programming assistance apparatus comprising:
   at least one hardware processor; and
   an error resolver, executed by the at least one hardware processor, to
      ascertain, for a software program that is to be completed, code for the program,
      identify, based on an analysis of the ascertained code and error message-based contextual information generated by a compiler associated with the ascertained code, at least one error in the ascertained code,
      generate, based on the at least one identified error, a resolution to the at least one identified error, and
      modify, based on the generated resolution to the at least one identified error, the ascertained code to resolve the at least one identified error;
      run the modified ascertained code through the compiler,
         wherein the compiler accepts the modified ascertained code on confirming absence of new errors in the modified ascertained code and that the modified ascertained code includes less number of errors than the ascertained code and
         wherein the compiler rejects the modified ascertained code, wherein the modified ascertained code includes new errors or the modified ascertained code includes greater number of errors than the ascertained code;
   a code generator, executed by the at least one hardware processor, to
      generate, based on an analysis of the ascertained code and problem description-based contextual information associated with the ascertained code, a next token associated with the ascertained code,
      generate, based on the next token associated with the ascertained code, further code for the program to be completed, and
      add the further generated code to the code of the program to be completed;
   a personalized feedback generator, executed by the at least one hardware processor, to
      analyze, for the program, a performance of a user with respect to generation of the code for the program, and
      generate, based on the analyzed performance of the user, feedback for the user; and
   a response generator, executed by the at least one hardware processor, to
      ascertain, from the user, a query associated with the program,
      classify, by utilizing an ontology, the query into a specified concept of a plurality of concepts, and
      generate, based on an analysis of the classified query, a response to the query.

2. The artificial intelligence-based intelligent programming assistance apparatus according to claim 1, wherein the error resolver is executed by the at least one hardware processor to identify, based on the analysis of the ascertained code and error message-based contextual information associated with the ascertained code, the error in the ascertained code by:
   identifying, based on the analysis of the ascertained code and training data concatenated with the error message-based contextual information associated with the ascertained code, the error in the ascertained code.

3. The artificial intelligence-based intelligent programming assistance apparatus according to claim 1, wherein the error resolver is executed by the at least one hardware processor to generate, based on the identified error, the resolution to the identified error by:
generating, based on sequence-to-sequence networks, the resolution to the identified error.

4. The artificial intelligence-based intelligent programming assistance apparatus according to claim 1, wherein the error resolver is executed by the at least one hardware processor to identify, based on the analysis of the ascertained code and error message-based contextual information associated with the ascertained code, the error in the ascertained code by:
utilizing an encoder and a decoder including recurrent neural network (RNN) layers that are implemented using long short-term memory (LSTM) blocks to identify the error in the ascertained code.

5. The artificial intelligence-based intelligent programming assistance apparatus according to claim 1, wherein the error resolver is executed by the at least one hardware processor to:
identify, for the ascertained code, code tokens; and
assign weights to the code tokens based on influence of the code tokens to an output of the program.

6. The artificial intelligence-based intelligent programming assistance apparatus according to claim 1, wherein the code generator is executed by the at least one hardware processor to generate, based on the analysis of the ascertained code and problem description-based contextual information associated with the ascertained code, the next token associated with the ascertained code by:
generating, based on the analysis of the ascertained code and training data concatenated with the problem description-based contextual information associated with the ascertained code, the next token associated with the ascertained code.

7. The artificial intelligence-based intelligent programming assistance apparatus according to claim 1, wherein the code generator is executed by the at least one hardware processor to:
generate a probability of occurrence of the next token associated with the ascertained code.

8. The artificial intelligence-based intelligent programming assistance apparatus according to claim 1, wherein the personalized feedback generator is executed by the at least one hardware processor to analyze, for the program, the performance of the user with respect to generation of the code for the program, and generate, based on the analyzed performance of the user, the feedback for the user by:
clustering errors being made by the user with respect to generation of the code for the program;
determining, based on the clustering of the errors, most frequently made errors;
analyzing, for the program, the performance of the user with respect to the most frequently made errors; and
generating, based on the analyzed performance of the user, the feedback for the user.

9. The artificial intelligence-based intelligent programming assistance apparatus according to claim 1, wherein the error resolver is executed by the at least one hardware processor to generate, based on the at least one identified error, the resolution to the identified error by:
providing the modified code to a compiler; and
iteratively fixing multiple identified errors in the modified code by receiving output from the compiler, wherein the at least one identified error includes the multiple identified errors, and the output from the compiler is indicative of the at least one identified error present in the modified code.

10. The artificial intelligence-based intelligent programming assistance apparatus according to claim 1, wherein the error resolver is executed by the at least one hardware processor to generate, based on the identified error, the resolution to the identified error by:
defining a template for each unique type of error message present in the training data; and
mapping error messages in the error message-based contextual information to a corresponding template.

11. A method for artificial intelligence-based intelligent programming assistance, the method comprising:
ascertaining, by at least one hardware processor, for a software program that is to be completed, code for the program;
identifying, by the at least one hardware processor, based on an analysis of the ascertained code and error message-based contextual information generated by a compiler associated with the ascertained code, an error in the ascertained code;
generating, by the at least one hardware processor, based on the identified error, a resolution to the identified error;
modifying, by the at least one hardware processor, based on the generated resolution to the identified error, the code for the program to resolve the identified error;
running, by the at least one hardware processor, the modified ascertained code through the compiler,
wherein the compiler accepts the modified ascertained code on confirming absence of new errors in the modified ascertained code and that the modified ascertained code includes less number of errors than the ascertained code and
wherein the compiler rejects the modified ascertained code, wherein the modified ascertained code includes new errors or the modified ascertained code includes greater number of errors than the ascertained code;
generating, by the at least one hardware processor, based on an analysis of the ascertained code and problem description-based contextual information associated with the ascertained code, a next token associated with the ascertained code;
generating, by the at least one hardware processor, based on the next token associated with the ascertained code, further code for the program;
adding, by the at least one hardware processor, the further generated code to the code for the program;
analyzing, by the at least one hardware processor, for the program, a performance of a user with respect to generation of the code for the program;
generating, by the at least one hardware processor, based on the analyzed performance of the user, feedback for the user;
ascertaining, by the at least one hardware processor, from the user, a query associated with the program;
classifying, by the at least one hardware processor, by utilizing an ontology, the query into a specified concept of a plurality of concepts; and
generating, by the at least one hardware processor, based on an analysis of the classified query, a response to the query.

12. The method according to claim 11, wherein identifying, by the at least one hardware processor, based on the analysis of the ascertained code and error message-based contextual information associated with the ascertained code, the error in the ascertained code, further comprises:

identifying, by the at least one hardware processor, based on the analysis of the ascertained code and training data concatenated with the error message-based contextual information associated with the ascertained code, the error in the ascertained code.

13. The method according to claim 11, wherein generating, by the at least one hardware processor, based on the identified error, the resolution to the identified error, further comprises:

generating, by the at least one hardware processor, based on sequence-to-sequence networks, the resolution to the identified error.

14. The method according to claim 11, wherein identifying, by the at least one hardware processor, based on the analysis of the ascertained code and error message-based contextual information associated with the ascertained code, the error in the ascertained code, further comprises:

utilizing, by the at least one hardware processor, an encoder and a decoder including recurrent neural network (RNN) layers that are implemented using long short-term memory (LSTM) blocks to identify the error in the ascertained code.

15. The method according to claim 11, further comprising:

identifying, by the at least one hardware processor, for the ascertained code, code tokens; and assigning, by the at least one hardware processor, weights to the code tokens based on influence of the code tokens to an output of the program.

16. The method according to claim 11, wherein generating based on the at least one identified error, the resolution to the identified error further comprises:

providing, by the at least one hardware processor the modified code to a compiler; and iteratively fixing, by the at least one hardware processor, multiple identified errors in the modified code by receiving output from the compiler, wherein the at least one identified error includes the multiple identified errors, and the output from the compiler is indicative of the at least one identified error present in the modified code.

17. The method according to claim 11, wherein generating, by the at least one hardware processor based on the identified error, the resolution to the identified error further comprises:

defining, by the at least one hardware processor, a template for each unique type of error message present in the training data; and mapping, by the at least one hardware processor, error messages in the error message-based contextual information to a corresponding template.

18. A non-transitory computer readable medium having stored thereon machine readable instructions, the machine readable instructions, when executed by at least one hardware processor, cause the at least one hardware processor to:

ascertain, for a software program that is to be completed, code for the program;

identify, based on an analysis of ascertained code and problem description-based contextual information generated by a compiler associated with the ascertained code, an error in the ascertained code;

generate based on the identified error, a resolution to the identified error;

modify based on the generated resolution to the identified error, the ascertained code to resolve the identified error;

run the modified ascertained code through the compiler, wherein the compiler accepts the modified ascertained code on confirming absence of new errors in the modified ascertained code and that the modified ascertained code includes less number of errors than the ascertained code and wherein the compiler rejects the modified ascertained code, wherein the modified ascertained code includes new errors or the modified ascertained code includes greater number of errors than the ascertained code;

generate, based on an analysis of the ascertained code and problem description-based contextual information associated with the ascertained code, a next token associated with the ascertained code;

generate, based on the next token associated with the ascertained code, further code for the program; and add the further generated code to the code for the program;

analyze, for the program, a performance of a user with respect to generation of the code for the program;

generate, based on the analyzed performance of the user, feedback for the user;

ascertain, from the user, a query associated with the program;

classify, by the at least one hardware processor, by utilizing an ontology, the query into a specified concept of a plurality of concepts; and generate, based on an analysis of the classified query, a response to the query.

19. The non-transitory computer readable medium according to claim 18, wherein the machine readable instructions for generating the resolution to the identified error, when executed by the at least one hardware processor, further cause the at least one hardware processor to:

provide the modified code to a compiler; and iteratively fix multiple identified errors in the modified code by receiving output from the compiler, wherein the at least one identified error includes the multiple identified errors, and the output from the compiler is indicative of the at least one identified error present in the modified code.

20. The non-transitory computer readable medium according to claim 18, wherein the machine readable instructions for generating based on the identified error, the resolution to the identified error when executed by the at least one hardware processor, further cause the at least one hardware processor to:

define a template for each unique type of error message present in the training data; and map error messages in the error message-based contextual information to a corresponding template.

* * * * *